United States Patent Office 2,793,192
Patented May 21, 1957

2,793,192
OPTICAL BLEACHING COMPOSITIONS CONTAINING TERTIARY AMINO SUBSTITUTED 2-ARYL ARYLENEAZOLES

Julian Jacob Leavitt, Plainfield, N. J., assignor to American Cyanamid Company, New York, N. Y., a corporation of Maine No Drawing. Application October 14, 1953,
Serial No. 386,132

5 Claims. (Cl. 252—301.2)

This invention relates to new optical bleaching agents and to compositions containing them and to fibers dyed therewith. More specifically, it relates to 2-aryl aryleneazoles substituted by a tertiary amino group, and to the use of this class of compounds for the whitening of various type of fibers as defined below.

The compounds of this invention may be illustrated by the following formula:

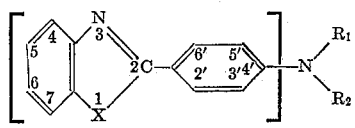

where X may be S, NH or O and $R_1$ and $R_2$ are aliphatic hydrocarbon radicals. $R_1$ and $R_2$ may be identical or different, and they may be joined to form an alicyclic ring. These azoles may be used alone or in mixtures with other optical bleaching agents or in mixtures with each other to obtain the most desirable hue of fluorescence.

Optical bleaching agents have appeared in great numbers on the market in the last few years. The principle of their operation is that a white dye is applied to the cloth, the said dye having a blue fluorescence which is used to cancel out optically the natural yellow of the cloth. A pure blue fluorescence cannot always be achieved readily. Some optical bleaching agents are reddish blue in hue and others have a greenish tinge. Soap manufacturers are not agreed among themselves as to which shade of fluorescence is most desirable. Some want a redder fluorescence and some a greener fluorescence than others. The ideal situation is a pure blue fluorescence sometimes called neutral blue fluorescence.

I have found that the tertiary amino aryl aryleneazoles of this invention are particularly useful for whitening of various materials because they possess complementary hues of fluorescence. Thus, I have found that when the tertiary amino nitrogen was bonded to the aryl ring, the compound fluoresces a reddish shade of blue. When the tertiary amino nitrogen was bonded to the aryleneazole ring, the compound fluoresces a greenish shade of blue. This permits the use of either derivatives where the exact shade is not critical or their use in combination with each other, or with certain other types of whiteners, where a specific hue is required.

It is a particular advantage of certain blends of two different tertiary amino substituted aryl aryleneazoles which give a blue shade of fluorescence, that both products exhaust on fiber at the same rate and have equal fastness.

It is another advantage of many tertiary amino substituted 2-aryl aryleneazoles that their fluorescent strength is superior to well-known optical bleaching agents that have found commercial acceptance. These products have affinity for both cellulosic and non-cellulosic materials but are particularly useful for the latter. In the discussion which follows and in the examples, I will refer to the 2-phenylbenzothiazoles because these compounds are the preferred embodiment of my invention.

As indicated above, 2-phenylbenzothiazoles which have a

substituent, in which the $R_1$ and $R_2$ are defined as above, are good optical bleaching agents for fibers but that they have a decided reddish blue shade of fluorescence. I have also noted that 2-phenylbenzothiazoles which have a

substituent, in which $R_1$ and $R_2$ have the same definition, are likewise good optical bleaching agents but that these compounds have a greenish blue shade of fluorescence. I have further found that these classes of compounds are good shading components, that is, the reddish blue class can be used to cancel out greenish tinges of fluorescence and vice versa the greenish blue class can be used to cancel out reddish cast fluorescence. While it is an especially good blend if one of each of the above classes is present in the mixture, blends may also be made which contain more than two optical bleaching agents.

It is a further advantage that by using the compounds of my invention I obtain a flexibility of shade. Since the soap and detergent manufacturers have individual tastes in the shade of fluorescence desired, the chemical manufacturers find it difficult to supply all the desired shades. A great many compounds must be prepared to fill these needs. By using the compounds of my invention, it is necessary to make only two products. By blending these in the proper proportions the specific taste of any customer can be readily supplied. The manufacturers can pick their own shades and the dyestuff manufacturers need not maintain a large line of optical bleaching agents.

It is another advantage of the compounds of my invention that the dyes build up well on the fiber. This is especially true when each component of the blend is a member of one of the two benzothiazole classes described above. Such compounds when used in combination, build up evenly, maintaining the same shade and having about the same fastness properties.

While blends of 4'-dialkylamino-2-phenylbenzothiazoles with 6-dialkylamino-2-phenylbenzothiazoles are a preferred embodiment, either component can be used to shade other optical bleaching agents to get a desired shade. For example, there are many coumarin derivatives on the market as commercial optical bleaching agents for non-cellulosic fibers. These can be mixed as desired with a member of either class of the 2-phenylbenzothiazole derivatives of my invention. A specific example of this embodiment is the blending of a well-known optical bleaching agent, 4-methyl-7-diethylamino coumarin, which has a reddish blue fluorescence, with one of the 6-dialkylamino-2-benzothiazoles to obtain a more neutral or even a slightly greenish shade of fluorescence. Other commercial optical bleaching agents have a greenish blue fluorescence and with these one can blend one of the 4'-dialkylamino-2-phenylbenzothiazole derivatives to obtain a modified and redder shade of fluorescence.

The exact shade of fluorescence of any specific member of either class is not predictable. The shade varies with the substituents on the molecule and the only prediction that can be made is that the position of the dialkylamino group determines whether the fluorescence is on the reddish or greenish side of pure blue. It is therefore not possible to predict accurately what the exact shade of the blend will be until tests have been made. The exact composition which will give a pure neutral fluorescence will be unique for any given combination and must be determined by experimentation. An example of such a composition is that in one of the preferred embodiments of my invention it takes 70 parts of 6-methyl-4'-dimethylamino-2-phenylbenzothiazole and 15 parts of 6-dimethylamino-2-phenylbenzothiazole to produce a neutral blue fluorescence. Other substituents in the molecules produce different base shades and require different proportions.

I further find that the 2-phenylbenzothiazoles of my invention are also substantive on cellulosic fibers. This is most surprising in the absence of known "substantive" groups and in the absence of any solubilizing groups such as sulfonic acid groups. I can therefore use them to blend with cellulosic optical bleaching agents such as diacylamino-stilbene-disulfonic acids, 1,3,5-triazinyl-diaminostilbene-disulfonic acid derivatives, triazinylaminoacylaminostilbene disulfonic acid derivatives and acylated benzidine sulfone disulfonic acids. It is possible, however, to sulfonate the compounds of my invention to make them even more soluble in water and therefore even more readily usable in blending with cellulosic optical bleaching agents.

It is a further feature of my invention that it is possible to use these compounds to whiten soaps and detergents. Because of the strength of fluorescence of these products as compared with the several commercial products much less optical bleaching agent may be required to produce the same effect. The compositions of matter of this embodiment of this invention may contain, for example, as the detergent component, sulfite cellulose waste liquor or condensation products of naphthalene sulfonic acids which may be alkylated with formaldehyde, or other sponaceous cleaning agents which, as is known, are also good emulsifying agents. As examples of such sponaceous cleaning agents there can be named ordinary soaps, salts of sulfonated washing agents, for example, of sulfonated benzimidazoles substituted at the 2-carbon atom by higher alkyl radicals, monocarboxylic acid esters of 4-sulfophthalic acid having higher fatty alcohol residues, and also salts of sulfonated fatty alcohols or condensation products of higher fatty acids with aliphatic hydroxy- or aminosulfonic acids. Such sulfonated washing agents are representatives of the group of the synthetic anion-active cleaning agents. The indicated sulfonated washing agents contain either the sulfonic acid group —$SO_3H$ or the sulfuric acid ester group —$OSO_3H$. They contain therefore radicals of sulfuric acid. In the compositions of matter of my invention it will be recognized that polyglycol ethers of a fatty alcohol may be present as an emulsifying agent.

Again the exact shade of fluorescence desired for a particular detergent may be obtained by blending 4'-dialkylamino-2-phenylbenzothiazoles with 6-dialkylamino-2-phenylbenzothiazoles, or by mixing either or both of the 2-phenylbenzothiazoles with certain other bleaching agents.

The material to be improved can be washed and bleached simultaneously with a composition of matter which contains a cleansing agent. An especially pronounced brightening effect is produced when undyed animal fibers, especially wool, are treated with mixtures containing such washing agents.

The compositions of matter used in the process of this invention may be also applied in the course of the manufacture fo the material to be improved. In this case the compound may be added, for example, to a paper mass or a viscose solution which is to be used for making films or filaments.

The compositions of matter of the invention may also be added, for example, to liquors used for imparting a crease resistant finish. They are also suitable for the after-treatment of discharge prints.

In a preferred embodiment of my invention I contemplate that solid blends of the two optical bleaching agents may be prepared and the mixture used as a unit in adding to soaps, dyebaths, and the like. Alternatively it is contemplated that different optical bleaching agents may be added separately in the proper proportions. For example, separate solutions may be prepared and the proper amounts of each added to the detergent to get the desired shade. Alternatively, such solutions of each optical bleaching agent or a solution of the blend may be added to the dyebath after the soap has been dissolved but before the fiber is immersed. Alternatively also, the optical bleaching agents may be dissolved separately, or as a blend, in a non-aqueous solution and added directly to the fiber after the completion of the washing. The composition of matter which comprises the fibers dyed with the compounds of our invention therefore forms a separate and distinct embodiment of our invention.

The compounds of our invention can be applied to synthetic fibers, such as nylon, in for example aqueous lower alkanol solution, with or without the presence of detergents, to impart a desired sheen by virtue of the fluorescence of the dyes.

The 2-aryl arylenethiazoles generally of a reddish blue shade of fluorescence to be used in my invention are those with an dialkylamino substituent in the aryl group, preferably in a position conjugated with the azole ring. For illustrative purposes, the general formula for the 2-phenylbenzothiazole derivative follows:

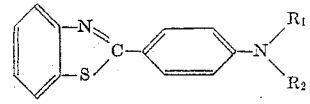

in which $R_1$ and $R_2$ represent aliphatic groups such as methyl, ethyl, propyl, isopropyl, butyl; or an alkenyl such as propenyl or butenyl; or an alkenyl such as propenyl or butenyl; or substituted alkyl such as chloralkyl, hydroxyalkyl etc.; or cyclic radicals such as cyclohexyl. $R_1$ and $R_2$ may be the same or different and may be joined together to form a ring. Other substituents may be present in either benzene ring, which substituents will modify the shade of the fluorescence. Among those compounds found to be effective are 4'-dimethylamino-6-methyl-2-phenylbenzothiazole, 4'- dimethylamino- 2- phenylbenzothiazole, 4'- diethylamino - 6 - methyl - 2 - phenylbenzothiazole, 4'-diallylamino-6-methyl-2-phenylbenzothiazole, 4'- dimethylamino-4- methyl-6- chloro-2- phenylbenzothiazole, 4'-dimethylamino-6-methoxy-2-phenylbenzothiazole, 4'-dimethylamino-6-ethoxy-2-phenylbenzothiazole, 4'-dibutylamino-2-phenylbenzothiazole, 4'-di-isopropylamino-6-methyl-2-phenylbenzothiazole, 4'-dimethylamino-4,6,2'-trimethyl-2-phenylbenzothiazole, 4'-methyl-isoamylamino-6-2'-dimethyl-2-phenylbenzothiazole, 4'-bis (β-hydroxyethyl)- and 4'-bis (β-chlorethyl)-2-phenylbenzothiazole, 4'-dicyclohexylamino-2-phenylbenzothiazole, 2- piperidinyl- and 2-morpholinylphenyl benzothiazoles and the like. Other useful compounds are the 2-(4'-dialkylaminophenyl) naphthothiazoles, the 2-(dialkylaminonaphthyl) benzo- and napthothiazoles and the imidazoles and oxazoles corresponding to the above compounds.

The preparation of these compounds proceeds by standard methods. One such method is the alkylation of the dehydrothio-para-toluidine or dehydrothio-xylidine. The use of the latter is one method of obtaining an alkyl substituent on the 2-phenyl ring. The alkylation can be carried out by the use of either alkyl halides or dialkyl sulfates. Alternatively, an ortho-aminothiophenol, with or without other substituents, can be condensed with a para-disubstituted-aminobenzaldehyde by the usual procedure. An alternative method is to acylate a bis(o-aminophenyl) disulfide with a para- disubstituted-aminobenzoyl chloride followed by the reduction of the disulfide to effect ring closure. Then benzimidazoles and benzoxazoles are prepared by well-known methods from the o-diamines and o-aminophenols respectively by condensation with the appropriate aldehyde.

The 6 - disubstituted amino - 2 - phenylbenzothiazoles, which are the preferred green shading components of my invention, have the general formula:

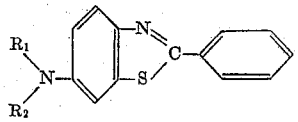

in which $R_1$ and $R_2$ represent aliphatic groups such as methyl, ethyl, propyl, isopropyl, butyl; or an alkenyl such as propenyl or butenyl; or substituted alkyl such as chloralkyl, hydroxyalkyl, etc.; or cyclic radicals such as cyclohexyl. $R_1$ and $R_2$ may be the same or different and may be joined together to form a ring. These compounds can be prepared by another standard series of reactions. Most conveniently para-nitroso-N,N-disubstituted anilines (prepared by the action of nitrous acid on an N,N-disubstituted aniline) are condensed with sodium thiosulfate by a procedure described in the literature to produce a 2-amino-5-disubstituted amino benzene thiosulfuric acid. These compounds react directly with aldehydes, as is known in the literature, to form 6 - disubstituted amino 2 - phenylbenzothiazoles directly. By the choice of the proper aldehydes various substituents may be introduced into the 2-phenyl portion of the molecule. By the choice of the proper disubstituted anilines, substituents can be introduced into the other benzene ring of the molecule. One can start with any disubstituted aniline in which the substituent on the nitrogen is an aliphatic radical such as methyl, ethyl, propyl, butyl, and the like; or a lower alkenyl group such as propenyl or butenyl; or a substituted alkyl or cycloaliphatic radicals as defined above. Among the compounds which may be prepared by this method are 6 - dimethylamino - 2 - phenylbenzothiazole, 5 - methyl - 6 - dimethylamino - 2 - phenylbenzothiazole, 5 - ethyl - 6 - dimethylamino - 2 - phenylbenzothiazole, 4 - methyl - 6 - dimethylamino - 2 - phenylbenzothiazole, 6 - diethylamino - 2 - phenylbenzothiazole, 6 - dibutylamino - 2 - phenylbenzothiazole, 2',3' - dimethoxy - 6 - dimethylamino - 2 - phenylbenzothiazole, 2',4' - dimethoxy-6 - dimethylamino - 2 - phenylbenzothiazole, 4' - methoxy-6 - dimethylamino - 2 - phenylbenzothiazole, 3',4' - dimethoxy - 6 - dimethylamino - 2 - phenylbenzothiazole, 4' - chloro - 6 - dimethylamino - 2 - phenylbenzothiazole, 4' - nitro - 6 - dimethylamino - 2 - phenylbenzothiazole, and the like.

The fibers to which the compounds of my invention can be applied include wool, silk, super-polyamides, polyacrylonitriles, co-polymers of acrylonitriles, super-polyesters, and the like. Also our products are substantive on cellulosic fibers such as cotton, rayon, cellulosic esters, and the like. Sulfonated derivatives are especially useful on protein fibers, such as wool or silk, and nylon.

My invention is further illustrated by the following examples in which parts are by weight unless otherwise specified.

Example 1

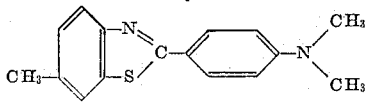

One hundred and twenty parts of dehydro thio-paratoluidine and 106 parts of anhydrous sodium carbonate are slurried in 400 parts of methyl alcohol. 142 parts of methyl iodide is added gradually. The mixture is then stirred at the reflux until the reaction is substantially complete. The mixture is then cooled and drowned in 4000 parts of water. The product is isolated by filtration and washing. The crude product is purified by dissolving in 1000 parts of five normal hydrochloric acid at 80° C. 200 parts of alcohol is added followed by a smaller amount of activated charcoal. The solution is clarified hot and the filtrate is cooled. The precipitated amine hydrochloride is basified and the free amine is isolated by filtration and washing.

By the use of equivalent amounts of ethyl iodide and allyl bromide, respectively, the corresponding diethylamino and diallylamino derivatives are prepared following the same procedure.

Example 2

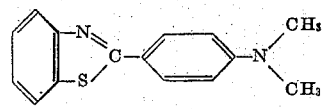

One hundred and twenty-four parts of bis-ortho-aminophenyldisulfide and 164 parts of para-dimethylaminobenzaldehyde are added to 2000 parts of acetic acid. The mixture is stirred at the boil until the reaction is substantially complete. It is then cooled and drowned in 5000 parts of water. A yellowish tarry product precipitates and is separated and dissolved in a mixture of 1000 parts of ethyl alcohol and 500 parts of concentrated hydrochloric acid at the boil. The boiling solution is decolorized with charcoal and cooled. The precipitated product is isolated by filtration and reslurried in water. The slurry is made alkaline with ammonia and the free amine is isolated by filtration and washing.

Example 3

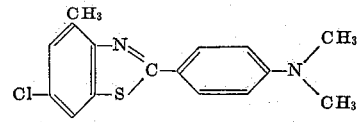

Two hundred and twenty-one parts of the zinc salt of 2 - amino - 3 - methyl - 5 - chlorothiophenol is added to 1500 parts of acetic acid. 150 parts of para-dimethylaminobenzaldehyde is added and the mixture is stirred at reflux until the reaction is substantially complete. It is then cooled and the precipitated product is purified by dissolving in a mixture of 3000 parts of ethyl alcohol and 500 parts of 5 normal hydrochloric acid at the boil. After a charcoal purification and clarification, the cooled filtrate is basified with ammonium hydroxide. The precipitated free amine is isolated by filtration and washing.

By using equivalent amounts of the zinc salts of 2-amino-5-methoxy thiophenol or 2-amino-5-ethoxy thiophenol, the same procedure may be used to produce the corresponding 6 - methoxy - or 6 - ethoxy - 4' - dimethylamino - 2 - phenylbenzothiazole.

Example 4

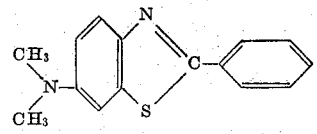

One hundred parts of dimethyl aniline is dissolved in 500 parts of concentrated hydrochloric acid. 300 parts of ice is added to the solution followed gradually by a solution of 70 parts of sodium nitrite in 200 parts of water. The mixture is kept below 0° C. during this addition and is stirred at 0° C. until the reaction is substantially complete. The product is isolated by filtration and dissolved in 800 parts of water. The free base is precipitated by adding ammonium hydroxide. The para-nitroso dimethylaniline is isolated by filtering and is washed and dried. A solution of 300 parts of water, 29 parts of acetic acid, and 0.9 parts of sodium nitrite is heated to 68° C., and 15.1 parts of the para-nitroso dimethyl aniline is added. The mixture is stirred while a solution of 61.8 parts of sodium thiosulfate crystals in 300 parts of water is added. The solution is stirred at 70–72° C. until the reaction is substantially complete. A slurry of 11.7 parts of benzaldehyde, 100 parts of water, and 10 parts of alcohol is then added. The mixture is stirred at 95° C. until the reaction is substantially complete. 100 parts of acetic acid is then added gradually and the mixture is cooled. The precipitated crystalline product is isolated by filtration and dissolved in 300 parts of alcohol acidified with hydrochloric acid. The solution is clarified and diluted with 300 parts of water. The product is precipitated by basification with ammonia. It is isolated and washed neutral and dried. It may be recrystallized from organic solvents to produce a light yellow crystalline solid melting point 133–135° C.

By following the same procedure but substituting for the benzaldehyde equivalent amounts of 2,3-dimethoxy benzaldehyde, 2,4-dimethoxy benzaldehyde, 3,4-dimethoxy benzaldehyde, and 4-methoxy benzaldehyde, the corresponding dimethoxy or methoxy derivatives of the 6-dimethylamino-2-phenylbenzaldehyde are readily obtained.

Example 5

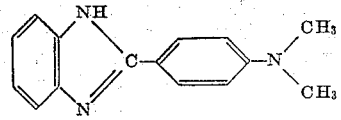

A mixture of 10.8 parts of o-phenylene diamine, 14.9 parts of p-dimethylamino benzaldehyde, and 5 parts of zinc chloride is fused and stirred at 190–200° C. until the reaction is substantially complete. On cooling the mixture solidifies. The solid is dissolved in hot water containing hydrochloric acid and decolorized with charcoal. After the clarification the filtrate is cooled and a light colored precipitate appears. This is isolated by filtration and reslurried in water. The slurry is made slightly alkaline with sodium hydroxide and the free benzimidazole and isolated by filtration and washing. The crude product may be recrystallized from a mixture of 2 parts of alcohol to 1 part of water.

Example 6

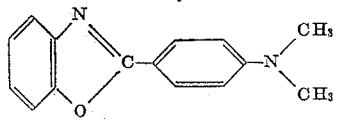

Two hundred and sixteen parts of o-amino phenol and 296 parts of p-dimethylamino benzaldehyde is dissolved in 2500 parts of alcohol and the mixture is refluxed until the reaction is substantially complete. The mixture is cooled and the precipitated Schiff-S base is isolated by filtration and washing. More of the product may be isolated by evaporation of the mother liquor.

Twenty-six parts of the Schiff base is dissolved in 500 parts of benzene at the boil. Forty-four parts of lead tetra-acetate is added and the mixture is boiled until the reaction is substantially complete. The crystalline mass which separates is filtered off, and the mother liquor is evaporated. The residue is dissolved in aqueous hydrochloric acid and filtered. The filtrate is then basified with ammonium hydroxide and the free benzoxazole which precipitates is isolated by filtration, washing, and drying. The crude product is recrystallized from 60 parts of alcohol plus 25 parts of water with a charcoal decolorization. The recrystallized product is isolated by filtration and washed and dried. A further crop of purified product may be isolated by dilution of the mother liquor with water.

Example 7

Five parts of the product of Example 1 is dissolved in 150 parts of 7% oleum. The solution is stirred and heated to 120° C. and held at 110–120° C. until the reaction is substantially complete. After cooling, the solution is drowned on ice, filtered, and washed. The precipitate is dissolved in hot dilute alkali, clarified, cooled, and diluted with 3 volumes of saturated brine. The precipitate is filtered and dried. The crude sodium salt is heated in a mixture of 600 parts of 50% ethanol and 30 parts of 5-Normal hydrochloric acid for 2 hours at 90° C., cooled, filtered, washed with water, then dried. The resulting acid is dissolved in aqueous alcoholic alkali, charcoaled, and salted to give the purified sodium salt in good yield.

By the use of this procedure, the products of Examples 2 to 6 can be similarly sulfonated to give water soluble sodium salts.

Example 8

A solution of 27.3 parts of dehydrothio-para-toluidine sulfonic acid in 100 parts of water and 20 parts 5-Normal sodium hydroxide is treated at room temperature with 41.2 parts of dimethyl sulfate. The mixture is basified with 30 parts of 5 N sodium hydroxide, heated at 85–90° C. for one-half hour and again basified with 20 parts of 5-Normal alkali. After the addition of a second portion of 41.2 parts of dimethyl sulfate, it is basified with 75 parts of 5-Normal caustic and heated at 85–90° C. until the reaction is substantially complete. The solution is cooled and treated with 110 parts of saturated brine to give a voluminous precipitate which is filtered off, dissolved in 500 parts ethanol, charcoaled, clarified, and treated with 120 parts of concentrated hydrochloric acid. The slurry is heated to the boiling point to dissolve the precipitate, charcoaled, clarified, and diluted with 900 parts of water. The precipitate is filtered off, dissolved in hot aqueous alkali, cooled, and salted to give a good yield of the desired product. If desired, the material can be further purified by reconversion to the free acid followed by reformation of the sodium salt.

Example 9

Nylon cloth is dyed in the usual manner (by adding an aqueous alcoholic solution of the optical bleaching agent to a detergent bath) with the following compounds, with the results given.

| Compound | Fluorescence |
| --- | --- |
| 4'-dimethylamino-6-methyl-2-phenylbenzothiazole | reddish blue (Standard A). |
| 4'-diethylamino-6-methyl-2-phenylbenzothiazole | similar to "A". |
| 4'-diallylamino-6-methyl-2-phenylbenzothiazole | slightly redder than "A". |
| 4'-dimethylamino-2-phenylbenzothiazole | similar to "A". |
| 4'-dimethylamino-4-methyl-6-chloro-2-phenylbenzothiazole. | slightly less red than "A". |
| 4'-dimethylamino-6-methoxy-2-phenylbenzothiazole. | Do. |
| 4'-dimethylamino-2-phenylbenzimidazole | redder than "A". |
| 4'-dimethylamino-2-phenylbenzoxazole | Do. |
| 6-dimethylamino-2-phenylbenzothiazole | greenish blue (Standard B). |
| 4'-methoxy-6-dimethylamino-2-phenylbenzothiazole. | slightly redder than "B". |
| 2',3'-dimethoxy-6-dimethylamino-2-phenylbenzothiazole. | Do. |
| 2',4'-dimethoxy-6-dimethylamino-2-phenylbenzothiazole. | Do. |
| 3',4'-dimethoxy-6-dimethylamino-2-phenylbenzothiazole. | Do. |

Cellulose acetate or wool cloth, dyed in the same manner, gives similar results.

Example 10

Nylon cloth is dyed by the standard procedure with the following blends:

| Parts | Reddish Blue Component | Parts | Greenish Blue Component | Fluorescent Shade |
| --- | --- | --- | --- | --- |
| 79 | 4'-dimethylamino-6-methyl-2-phenylbenzothiazole. | 21 | 6-dimethylamino-2-phenylbenzothiazole. | approximately neutral. |
| 93.5 | ...do... | 6.5 | ...do... | reddish blue. |
| 62 | ...do... | 38 | ...do... | greenish blue. |
| 83 | 7-diethylamino-4-methylcoumarin | 17 | ...do... | slightly greenish. |
| 71 | 7-dimethylamino-4-methylcoumarin | 29 | ...do... | greenish. |
| 76 | 4'-dimethylamino-6-methyl-2-phenyl-benzothiazole. | 27 | 6-dimethylamino-4'-methoxy-2-phenylbenzothiazole. | approximately neutral. |
| 79 | 4'-dimethylamino-2-phenylbenzothiazole | 21 | 6-dimethylamino-2-phenylbenzothiazole. | slightly greenish. |
| 81.5 | 4'-dimethylamino-6-methoxy-2-phenylbenzothiazole. | 18.5 | ...do... | fairly neutral. |

Example 11

Cotton cloth is dyed by the standard procedure with the following blends:

| Parts | Reddish Blue Component | Parts | Greenish Blue Component | Fluorescent Shade |
|---|---|---|---|---|
| 25 | 4'-dimethylamino-6-methyl-2-phenylbenzothiazole. | 75 | 3,7-bis(2,4-dimethoxybenzoylamino)dibenzothiophene-5,5-dioxide-2,8-disulfonic acid, sodium salt. | redder than the sulfonic acid alone. |
| 80 | 4,4'-bis(2,4-dimethoxybenzoylamino)stilbene-2,2'-disulfonic acid, sodium salt. | 20 | 6-dimethylamino-2-phenylbenzothiazole. | greener than the sulfonic acid alone. |
| 85 | 4,4'-bis(2,4-dianilino-1,3,5-triazinyl-6-amino)stilbene-2,2'-disulfonic acid, sodium salt. | 15 | 6-dimethylamino-4'-methoxy-2-phenylbenzothiazole. | Do. |
| 75 | 4,4'-bis(2-ethoxybenzoylamino)stilbene-2,2'-disulfonic acid, sodium salt. | 25 | 6-dimethylamino-2-phenylbenzothiazole. | slightly greenish blue. |
| 25 | Sulfonated 4'-dimethylamino-6-methyl-2-phenylbenzothiazole. | 75 | 3,7-bis(2,4-dimethoxybenzoylamino)dibenzothiophene-5,5-dioxide-2,8-disulfonic acid, sodium salt. | redder than the sulfonic acid alone. |
| 80 | 4,4'-bis(2,4-dimethoxybenzoylamino)stilbene-2,2'-disulfonic acid, sodium salt. | 20 | Sulfonated 6-dimethylamino-2-phenylbenzothiazole. | greener than the sulfonic acid alone. |
| 85 | 4,4'-bis(2,4-dianilino-1,3,5-triazinyl-[6-amino)stilbene-2,2'-disulfonic acid, sodium salt. | 15 | Sulfonated 6-dimethylamino-4'-methoxy-2-phenylbenzothiazole. | Do. |
| 75 | 4,4'-bis(2-ethoxybenzoylamino)stilbene-2,2'-disulfonic acid, sodium salt. | 25 | Sulfonated 6-dimethylamino-2-phenylbenzothiazole. | slightly greenish blue. |

I claim:

1. Optical bleaching agent compositions comprising a mixture of 62–93.5% of a 4'-tertiary amino substituted 2-phenylbenzothiazole and 6.5–38% of a 6-tertiary amino substituted 2-phenylbenzothiazole in which the substituents on the amino nitrogen are aliphatic groups, each of said groups being of less than 7 carbon atoms, the said aliphatic groups being free of acidic and basic substituents.

2. The compositions according to claim 1 in which the 4'-tertiary amino substituted 2-phenylbenzothiazole is a 4'-dimethylamino-2-phenylbenzothiazole.

3. The compositions according to claim 1 in which the 6-tertiary amino substituted 2-phenylbenzothiazole is a 6-dimethylamino-2-phenylbenzothiazole.

4. Optical bleaching agent compositions according to claim 1 comprising a mixture of 4'-dimethylamino-2-phenylbenzothiazole and 6-dimethylamino-2-phenylbenzothiazole.

5. The composition according to claim 4 which comprises a mixture of 79% of 4'-dimethylamino-6-methyl-2-phenylbenzothiazole and 21% of 6-dimethylamino-2-phenylbenzothiazole.

References Cited in the file of this patent
UNITED STATES PATENTS

| 2,037,448 | Alleman | Apr. 14, 1936 |
| 2,347,644 | Sell | May 2, 1944 |
| 2,550,321 | Ackermann | Apr. 24, 1951 |
| 2,600,004 | Krahler | June 10, 1952 |

FOREIGN PATENTS

| 999,047 | France | Sept. 26, 1951 |

OTHER REFERENCES

Hunter: Chem. Abstracts, vol. 18, page 984 (1924).
Bogert et al.: Chem. Abstracts, vol. 26, page 1281 (1932).
Ast et al.: Chem. Abstracts, vol. 30, page 2193 (1936).